United States Patent
Inata et al.

(10) Patent No.: US 8,530,546 B2
(45) Date of Patent: Sep. 10, 2013

(54) CURABLE COMPOSITION COMPRISING INORGANIC OXIDE MICROPARTICLES THAT ARE SURFACE-MODIFIED WITH MALEIMIDE GROUPS

(75) Inventors: Kazumasa Inata, Nagoya (JP); Eiichi Okazaki, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 129 days.

(21) Appl. No.: 13/139,200

(22) PCT Filed: Dec. 11, 2009

(86) PCT No.: PCT/JP2009/070784
§ 371 (c)(1),
(2), (4) Date: Jun. 10, 2011

(87) PCT Pub. No.: WO2010/067876
PCT Pub. Date: Jun. 17, 2010

(65) Prior Publication Data
US 2011/0319582 A1    Dec. 29, 2011

(30) Foreign Application Priority Data
Dec. 12, 2008  (JP) .................. 2008-317611

(51) Int. Cl.
*C08K 9/06*    (2006.01)
(52) U.S. Cl.
USPC ........... 523/213; 526/262; 526/321; 526/328
(58) Field of Classification Search
USPC ................... 523/213; 526/262, 321, 328
See application file for complete search history.

(56) References Cited

U.S. PATENT DOCUMENTS

| | | |
|---|---|---|
| 6,410,611 B1 | 6/2002 | Sakurai et al. |
| 7,238,740 B2 * | 7/2007 | Belin et al. ............. 524/495 |
| 2003/0181562 A1 | 9/2003 | Belin et al. |
| 2006/0204738 A1 * | 9/2006 | Dubrow et al. ............. 428/292.1 |
| 2010/0132868 A1 * | 6/2010 | Hergenrother et al. ....... 152/564 |

FOREIGN PATENT DOCUMENTS

| | | | |
|---|---|---|---|
| EP | 982 311 | * | 3/2000 |
| JP | 11-124403 A | | 5/1999 |
| JP | 2004-75904 A | | 3/2004 |
| JP | 2004-346228 A | | 12/2004 |
| JP | 2005-23101 A | | 1/2005 |
| JP | 2005-187659 A | | 7/2005 |
| JP | 2006-225434 A | | 8/2006 |
| JP | 2007-231138 A | | 9/2007 |
| WO | WO 2009/054508 A1 | | 4/2009 |

OTHER PUBLICATIONS

International Search Report, dated Mar. 16, 2010 in PCT/JP2009/070784.
European Search Report mailed May 23, 2013 in European Patent Appl. No. 09831979.1.

* cited by examiner

*Primary Examiner* — Margaret Moore
(74) *Attorney, Agent, or Firm* — Birch, Stewart, Kolasch & Birch, LLP

(57) ABSTRACT

This invention is drawn to a curable composition that has excellent smoothness when a plastic substrate is coated therewith. Also disclosed are active energy beam curable compositions, such as actinically curable compositions, that can be cured without using a photopolymerization initiator, or with the use of a small amount thereof. This object is achieved by the presence of surface treated inorganic oxide microparticles. Such particles are obtained by reacting an alkoxysilane compound (a1) represented by the Formula (1) below and inorganic oxide microparticles (a2) in the presence of water and an organic solvent:

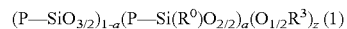

in which P denotes a maleimide containing group, $R^3$ denotes a hydrogen atom or a monovalent organic group, $R^0$ denotes a monovalent organic group, a is 0 or a positive number and satisfies $0 \leq a < 1$, and z is a positive number and satisfies $0.1 \leq z \leq 2$.

8 Claims, No Drawings

CURABLE COMPOSITION COMPRISING INORGANIC OXIDE MICROPARTICLES THAT ARE SURFACE-MODIFIED WITH MALEIMIDE GROUPS

TECHNICAL FIELD

The present invention relates to a curable composition comprising inorganic oxide microparticles that are surface-modified with maleimide groups. The curable composition of the present invention may be used preferably as an active energy beam-curable composition, and more preferably in a hard coat application, and relates to these technical fields.

BACKGROUND ART

Plastic materials have advantages such as low cost, light weight, and excellent processability, and are therefore widely used in various fields such as consumer electric products, automotive materials, and building materials. Plastic materials having excellent transparency, heat resistance, and mechanical properties are also used as optical films or plates (hereinafter, they are together abbreviated to 'optical sheets') used in liquid crystal displays or projection televisions, which are fields that have been growing recently.

However, since plastic materials have the defect that the surface is easily damaged, if this defect becomes an issue in terms of the application or the production process, it becomes necessary to carry out a hard coat treatment for protecting the plastic surface.

As a hard coat material, an active energy beam-curable composition is widely used since it has not only excellent scratch resistance, etc. but it also has excellent productivity due to energy conservation and a high cure rate. As an active energy beam-curable composition, an acrylic composition comprising a polyfunctional (meth)acrylate as a main component is predominant and has the advantage that it is inexpensive and has excellent scratch resistance.

However, polyfunctional (meth)acrylates have the problem of warp due to large curing shrinkage and the problem of swarf being generated when cutting a sheet.

In particular, swarf is not desirable in an optical sheet production site where a degree of cleanness is required. Furthermore, when used outdoors, there is the problem that cracks are easily caused on the surface due to exposure to ultraviolet light (UV).

As a technique for suppressing warp while giving excellent scratch resistance, an active energy beam-curable composition comprising an ethylenically unsaturated compound (A) having an isocyanurate skeleton, organic-covered inorganic microparticles (B) obtained by a condensation reaction of inorganic microparticles (b1) and an organic silane compound hydrolysis product (b2), a photopolymerization initiator (C), and a solvent (D) has been reported (Patent Document 1).

Furthermore, as a technique for satisfying both scratch resistance and weather resistance, an active energy beam-curable composition comprising (A) an alkoxysilyl group- and (meth)acryloyl group-containing resin, (B) colloidal silica having primary particle size of 1 to 200 nm, (C) a UV absorber, and/or (D) a light stabilizer has been reported (Patent Document 2).

Recently, as a composition for hard coat application that does not contain inorganic microparticles and has excellent scratch resistance and little warp, an active energy beam-curable composition comprising a penta- and/or hexa-acrylate of dipentaerythritol, an acrylate of pentaerythritol trimer to heptamer, and an acrylate of pentaerythritol octa- and higher-multimers at a predetermined ratio, and further comprising a photopolymerization initiator and a polyether-modified organopolysiloxane has been reported (Patent Document 3).

When the active energy beam is light there is, as a general problem with photocurable compositions, a problem with odor, etc. due to a decomposition product of a photopolymerization initiator. As a technique for solving this problem an active energy beam-curable composition comprising a polyfunctional maleimide compound that can be photocured without the addition of a photopolymerization initiator or with the addition of a small amount thereof has been reported (Patent Documents 4 and 5).

Patent Document 1 JP-A-2006-225434 (JP-A denotes a Japanese unexamined patent application publication)
Patent Document 2 JP-A-2004-346228
Patent Document 3 JP-A-2007-231138
Patent Document 4 JP-A-11-124403
Patent Document 5 JP-A-2005-23101

DISCLOSURE OF INVENTION

Problems to be Solved by the Invention

However, the compositions described in Patent Documents 1 and 2 above are not satisfactory in terms of warp after curing or swarf when cutting.

Furthermore, the composition described in Patent Document 3 above is not satisfactory in terms of reduction in warp after curing and UV resistance.

Moreover, the compositions described in Patent Documents 4 and 5 are not satisfactory in terms of scratch resistance of a cured material.

In light of these circumstances, there is a desire for a composition that has further suppressed warp after curing and swarf when cutting while having good scratch resistance and that has excellent UV resistance, substrate adhesion, etc., and a compound that is suitable for use in the composition. In particular, in a hard coat application, there is a desire for a composition exhibiting excellent performance in these terms.

It is an object of the present invention to provide a curable composition that has excellent smoothness when a plastic substrate is coated therewith and dried, causes hardly any warp after curing or swarf when cutting, and has excellent scratch resistance, transparency, adhesion, and UV resistance and, furthermore, to provide an active energy beam-curable composition that can be cured without using a photopolymerization initiator or with the use of a small amount thereof.

Means for Solving the Problems

As a result of an intensive investigation by the present inventors in order to solve the above-mentioned problems, it has been found that a composition comprising a reaction product (A) obtained by reacting an alkoxysilane compound (a1) having a maleimide group-containing specific structure and inorganic oxide microparticles (a2) in the presence of water and an organic solvent has excellent performance, and the present invention has thus been accomplished.

BEST MODE FOR CARRYING OUT THE INVENTION

The present invention relates to a curable composition comprising a reaction product (A) obtained by reacting an alkoxysilane compound (a1) represented by Formula (1)

below (hereinafter, simply called 'maleimide alkoxysilane (a1)') and inorganic oxide microparticles (a2) in the presence of water and an organic solvent (hereinafter, simply called 'reaction product (A)').

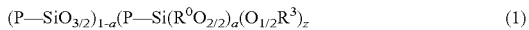
$$(P-SiO_{3/2})_{1-a}(P-Si(R^0O_{2/2})_a(O_{1/2}R^3)_z \quad (1)$$

In Formula (1), P denotes a group represented by Formula (2), which is described later, $R^3$ denotes a hydrogen atom or a monovalent organic group, $R^0$ denotes a monovalent organic group, a is 0 or a positive number and satisfies $0 \leq a < 1$, z is a positive number and satisfies $0.1 \leq z \leq 2$, P, $R^0$, and $R^3$ may each comprise two or more different types of groups in one molecule, and $R^0$ and $R^3$ may each be identical groups or different groups in one molecule.

Furthermore, when the composition of the present invention is used as an active energy beam-curable composition, since it can be cured without using a photopolymerization initiator, the problem with odor, etc. derived from a decomposition product of a photopolymerization initiator can be solved.

Since the composition of the present invention is a composition that has excellent smoothness when a plastic substrate is coated therewith and dried, causes hardly any warp after curing or swarf when cutting, and has excellent scratch resistance, transparency, adhesion, and UV resistance, it can be used suitably in various applications and can be used particularly suitably in a hard coat application.

The maleimide alkoxysilane (a1), inorganic oxide microparticles (a2), and reaction product (A) are explained in detail below.

In the present specification, an acryloyl or methacryloyl group is expressed as a (meth)acryloyl group, and an acrylate or methacrylate is expressed as a (meth)acrylate.

1. Maleimide Alkoxysilane (a1)

1-1. Definition of Maleimide Alkoxysilane (a1)

The maleimide alkoxysilane (a1) [hereinafter, also simply called (a1)], which is a starting material for the reaction product (A) of the present invention, is a compound represented by Formula (1) below.

(a1) means, as described in detail later, either a condensation product of an alkoxysilane in which an alkoxysilane is partially hydrolyzed/condensed, or a mixture of this condensation product and an alkoxysilane monomer.

$$(P-SiO_{3/2})_{1-a}(P-Si(R^0O_{2/2})_a(O_{1/2}R^3)_z \quad (1)$$

In Formula (1), P denotes a group represented by Formula (2) below, $R^3$ denotes a hydrogen atom or a monovalent organic group, $R^0$ denotes a monovalent organic group, a is 0 or a positive number and satisfies $0 \leq a < 1$, z is a positive number and satisfies $0.1 \leq z \leq 2$, P, $R^0$, and $R^3$ may each comprise two or more different types of groups in one molecule, and $R^0$ and $R^3$ may each be identical groups or different groups in one molecule.

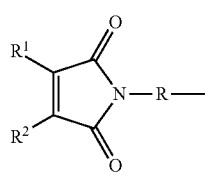

(2)

In Formula (2), $R^1$ and $R^2$ independently denote a hydrogen atom, a halogen atom, an alkyl group, an alkenyl group, or an aryl group, or $R^1$ and $R^2$ denote hydrocarbon groups together forming one 5-membered ring or 6-membered ring.

The alkyl group is preferably an alkyl group having 1 to 4 carbons.

The alkenyl group is preferably an alkenyl group having 2 to 4 carbons.

Examples of the aryl group include a phenyl group.

Examples of the hydrocarbon groups together forming one 5-membered ring or 6-membered ring include —CH$_2$CH$_2$CH$_2$—, —CH$_2$CH$_2$CH$_2$CH$_2$—, and —CH=CH—CH$_2$CH$_2$—.

Specific preferred examples of the maleimide group in Formula (2) are shown in Formula (5) to Formula (10) below. In Formula (9), X denotes a chlorine atom or a bromine atom. Ph in Formula (10) denotes a phenyl group.

(5)

(6)

(7)

(8)

(9)

(10)

Among them, it is preferable that both $R^1$ and $R^2$ are hydrogen atoms, one is a hydrogen atom and the other is an alkyl group, both are alkyl groups, or both are saturated hydrocarbon groups together forming one carbocycle since curability by irradiation with active energy beam is excellent.

Furthermore, with regard to $R^1$ and $R^2$, it is more preferable that one is a hydrogen atom and the other is an alkyl group, or both are saturated hydrocarbon groups together forming one carbocycle in terms of excellent composition curability and excellent scratch resistance of a cured material.

Moreover, with regard to $R^1$ and $R^2$, it is particularly preferable that one is a hydrogen atom and the other is an alkyl group.

Furthermore, the alkyl group denoted by $R^1$ and $R^2$ is preferably an alkyl group having 1 to 4 carbons.

In Formula (2), the divalent organic group denoted by R may be any divalent organic group. Preferred examples include a divalent saturated hydrocarbon group, -$A^1$-OCONH-$A^2$-, -$A^3$-S-$A^2$-, and -$A^3$-NH-$A^2$-. Here, $A^1$ and $A^2$ denote a divalent saturated hydrocarbon group having 1 to 6 carbons. The divalent saturated hydrocarbon group may be straight-chain or branched. $A^3$ denotes a structure after adding a thiol or an amine to a divalent organic group having an ethylenically unsaturated group at a terminal, and specific examples thereof include a divalent saturated hydrocarbon group and -$A^5$OCOCH($A^6$)$CH_2$—. $A^5$ denotes a divalent saturated hydrocarbon group having 1 to 6 carbons, and $A^6$ denotes a hydrogen atom or a methyl group.

Among the above, in terms of a cured material of the composition having excellent scratch resistance and UV resistance, R is preferably a divalent saturated hydrocarbon group, more preferably a divalent saturated hydrocarbon group having 1 to 6 carbons, and particularly preferably a straight-chain divalent saturated hydrocarbon group having 3 to 6 carbons.

In Formula (1), $R^3$ denotes a hydrogen atom or a monovalent organic group.

The monovalent organic group denoted by $R^3$ is preferably a monovalent organic group having 1 to 8 carbons. Specific examples include an alkyl group having 1 to 8 carbons, an alkoxyalkyl group having 1 to 8 carbons, and another organic group having 1 to 8 carbons formed from C, H, and O atoms.

Examples of the alkyl group having 1 to 8 carbons include a methyl group, an ethyl group, and a propyl group. Examples of the alkoxyalkyl group having 1 to 8 carbons include a 1-methoxy-2-propyl group and a 2-methoxyethyl group. Examples of the other organic group having 1 to 8 carbons formed from C, H, and O atoms include a group having a structure in which a hydroxy group is removed from diacetone alcohol.

The monovalent organic group having 1 to 8 carbons is preferably, in terms of a cured material of the composition having excellent scratch resistance and UV resistance, an alkyl group or alkoxyalkyl group having 1 to 4 carbons, and more preferably an alkyl group having 1 to 3 carbons.

In Formula (1), examples of the monovalent organic group denoted by $R^0$ include alkyl groups having 1 to 6 carbons such as a methyl group, an ethyl group, and a propyl group and aromatic groups such as a phenyl group.

Furthermore, $R^0$ is preferably an alkyl group having 1 to 6 carbons, in terms of a cured material of the composition having excellent scratch resistance is more preferably an alkyl group having 1 to 3 carbons, and is particularly preferably a methyl group or an ethyl group.

In Formula (1), a is 0 or a positive number and satisfies $0 \leq a < 1$, and z is a positive number and satisfies $0.1 \leq z \leq 2$.

a means the average proportion of (P—Si($R^0$)$O_{2/2}$) units in the [(P—$SiO_{3/2}$)$_{1-a}$(P—Si($R^0$)$O_{2,2}$)$_a$] unit, and z is the average value of ($O_{1/2}R^3$) units in (a1) overall.

The range of a is $0 \leq a < 1$, and preferably $0 \leq a \leq 0.5$. It is preferable for a to be no greater than 0.5 since a cured material of the composition has excellent scratch resistance.

In the present invention, (a1) is preferably a compound for which a=0 since the scratch resistance is excellent.

The range of z is $0.1 \leq z \leq 2$, preferably $0.6 \leq z \leq 2$, and more preferably $0.6 \leq z \leq 1.5$. By setting z at 0.1 or greater, modification of the surface of colloidal silica is sufficient, and a cured material has excellent scratch resistance.

The values for a and z may be determined from the integration ratio of hydrogen atoms in a $^1$H-NMR spectrum measurement of (a1).

Furthermore, P, $R^0$, and $R^3$ may each comprise two or more different types of groups in one molecule. That is, each unit of the (P—$SiO_{3/2}$)$_{1-a}$ unit, (P—Si($R^0$)$O_{2/2}$)$_a$ unit, and ($O_{1/2}R^3$) unit in Formula (1) may have two or more different units in one molecule. Moreover, P of the (P—$SiO_{3/2}$)$_{1-a}$ unit and P of the P—Si($R^0$)$O_{2/2}$)$_a$ unit may be identical or different in one molecule.

Furthermore, $R^0$ and $R^3$ may each be identical groups or different groups in one molecule.

The weight-average molecular weight of (a1) is preferably 400 to 10,000, and more preferably 500 to 5,000.

The weight-average molecular weight referred to in the present invention is the value of the molecular weight measured on a polystyrene basis by gel permeation chromatography.

(a1) is preferably a compound represented by Formula (3) below.

$$(P'\!\!-\!\!SiO_{3/2})(O_{1/2}R^{3'})_z \quad (3)$$

In Formula (3), P' denotes a group represented by Formula (4) below, $R^{3'}$ denotes a monovalent organic group having 1 to 8 carbons or a hydrogen atom, and z denotes a positive number for which $0.1 \leq z \leq 2$.

As one comprising a constitutional unit represented by Formula (3) above, one having a weight-average molecular weight of 500 to 5,000 is most preferable.

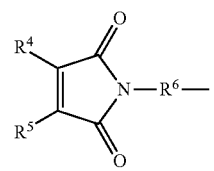

(4)

In Formula (4), with regard to $R^4$ and $R^5$, one is a hydrogen atom and the other is an alkyl group having 1 to 6 carbons, both are alkyl groups having 1 to 6 carbons, or they are saturated hydrocarbon groups together forming a 6-membered ring, and $R^6$ denotes a divalent saturated hydrocarbon group having 2 to 6 carbons.

With regard to $R^4$ and $R^5$, it is preferable that one is a hydrogen atom and the other is an alkyl group having 1 to 6 carbons, or they are saturated hydrocarbon groups together forming one 6-membered ring since the composition has excellent curability and a cured material has excellent scratch resistance.

With regard to $R^4$ and $R^5$, it is particularly preferable that one is a hydrogen atom and the other is an alkyl group having 1 to 6 carbons.

With regard to $R^4$ and $R^5$, the alkyl group having 1 to 6 carbons is preferably an alkyl group having 1 to 4 carbons since the composition has excellent curability.

$R^6$ denotes a divalent saturated hydrocarbon group having 2 to 6 carbons, and may be straight-chain or branched. Examples of the straight-chain saturated hydrocarbon group having 2 to 6 carbons include an ethylene group, a 1,3-propylene group, a 1,4-butylene group, a 1,5-pentanediyl group, and a 1,6-hexanediyl group. Examples of the branched alkylene group having 2 to 6 carbons include a 1,2-propylene group, a 1,2-butylene group, a 1,3-butylene group, a 2,3- butylene group, a 1,3-pentanediyl group, a 2,4-pentanediyl group, a 2,5-hexanediyl group, a 2-methyl-1,3-propylene group, a 2-ethyl-1,3-propylene group, and a 3-methyl-1,5-pentanediyl group.

$R^6$ is particularly preferably a straight-chain divalent saturated hydrocarbon group having 3 to 6 carbons.

In Formula (3), z denotes $0.1 \leq z \leq 2$.

The range for z is $0.1 \leq z \leq 2$, preferably $0.6 \leq z \leq 2$, and more preferably $0.6 \leq z \leq 1.5$. By setting z at 0.1 or greater, modification of the surface of colloidal silica is sufficient, and a cured material has excellent scratch resistance.

As described above, the values for z may be determined from the integration ratio of hydrogen atoms in a $^1$H-NMR spectrum measurement of (a1).

P and $R^3$ may each comprise two or more different types of groups in one molecule.

1-2. Process for Producing (a1)

As a process for producing (a1), various means may be employed.

A preferred production process is explained below; a case in which a=0 in Formula (1) is first explained, and then a case in which a≠0 is explained.

1-2-1. Case in which a=0

A preferred process for producing a compound for which a=0 in Formula (1) above, that is, a compound of Formula (1)′ below, is now explained.

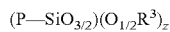
(1)′

As a preferred production process in this case, a process can be cited in which an aminoalkyltrialkoxysilane represented by Formula (12) below is added to a double bond-containing carboxylic acid anhydride represented by Formula (11) below in the presence of an organic solvent to thus form an amic acid, ring closure by heating is then carried out to thus form a maleimide group, and water generated by the ring closure reaction is consumed by a hydrolysis reaction of an alkoxy group.

This process is particularly preferable in terms of (a1) being produced simply, using readily available starting materials.

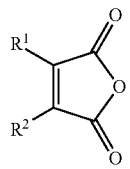
(11)

In Formula (11), $R^1$ and $R^2$ have the same meanings as above.

(12)

In Formula (12), R and $R^3$ have the same meanings as above.

Preferred examples of R and $R^3$ are also the same as above, and R is particularly preferably $R^6$ (a divalent saturated hydrocarbon group having 2 to 6 carbons).

This reaction is explained in more detail below.

First, the amino group of the aminoalkyltrialkoxysilane is added to the double bond-containing carboxylic acid anhydride, thus forming an amic acid (hereinafter, called an AMA) {Reaction Formula (1)}.

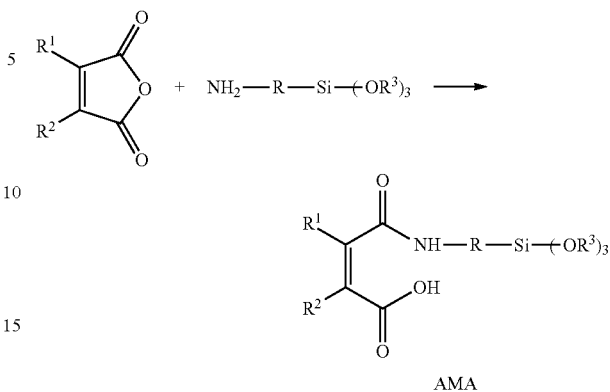

Reaction Formula (1)

Subsequently, when a solution containing the AMA is heated a ring closure reaction proceeds, thus forming a maleimide group. In this process, since water is formed at the same time, an alkoxy group undergoes hydrolysis, and a condensation reaction then proceeds {Reaction Formula (2)}.

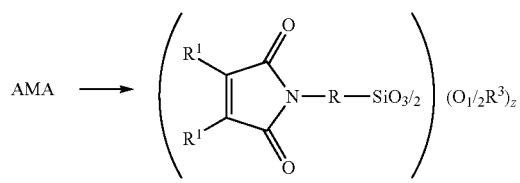

Reaction Formula (2)

Here, the value for z becomes 1 if the ring closure reaction is complete and all the water generated is consumed in the hydrolysis condensation reaction of the alkoxysilane.

In the above-mentioned production process, as an organic solvent, one that dissolves the AMA and does not react with the starting materials is preferable. Specifically, an aromatic compound such as toluene or xylene is preferable. However, since the reaction between the acid anhydride and the amino group is very fast, a polar solvent such as an alcohol or an ester may also be used.

The temperature of the ring closure reaction is preferably in the range of 70° C. to 150° C.

When as the organic solvent a compound that is sparingly miscible with water, for example, an aromatic compound, is used, after the reaction is completed it is preferable to carry out solvent removal. The proportions of the double bond-containing carboxylic acid anhydride and the aminoalkyltrialkoxysilane are preferably equimolar. With regard to the double bond-containing carboxylic acid anhydride and the aminoalkyltrialkoxysilane, a plurality of types thereof for each may be used in combination.

In the above-mentioned reaction, for the purpose of preventing polymerization of the starting materials or the maleimide group of the product, it is preferable to use a polymerization inhibitor and, moreover, it is preferable to introduce an oxygen-containing gas such as air to the reaction mixture.

Examples of the polymerization inhibitor include hydroquinone, tert-butylhydroquinone, hydroquinone monomethyl ether, 2,6-di-tert-butyl-4-methylphenol, 2,4,6-tri-tert-butylphenol, benzoquinone, phenothiazine, N-nitrosophenylhydroxylamine, the ammonium salt of N-nitrosophenylhydroxylamine, the aluminum salt of N-nitrosophenylhydroxylamine, copper dibutyldithiocarbamate, copper chloride, and copper sulfate.

1-2-2. Case in which a≠0

A preferred process for producing a compound for which a≠1 in Formula (1) above is now explained.

In this case also, the same production process as above is preferable, and a process can be cited in which an aminoalkyltrialkoxysilane represented by Formula (12) above and an aminoalkyldialkoxysilane represented by Formula (13) below are added to a double bond-containing carboxylic acid anhydride represented by Formula (11) above in the presence of an organic solvent to thus form an amic acid, ring closure by heating is then carried out to thus form a maleimide group, and water generated by the ring closure reaction is consumed by a hydrolysis reaction of an alkoxy group.

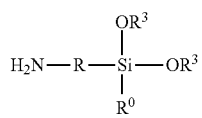
(13)

In Formula (13), R, $R^0$, and $R^3$ have the same meanings as above.

Preferred examples of R, $R^0$, and $R^3$ are also the same as above, and R is particularly preferably $R^6$ (a divalent saturated hydrocarbon group having 2 to 6 carbons).

The reaction method, reaction conditions, etc. may be the same as in 1-2-1.

2. Inorganic Oxide Microparticles (a2)

With regard to inorganic oxide microparticles as the inorganic oxide microparticles (a2) {hereinafter, also simply called (a2)}, as the type of inorganic oxide, various types of inorganic compound oxides and metal oxides may be used, and specific examples include silica, alumina, titanium oxide, zinc oxide, tin oxide, indium oxide, zirconium oxide, iron oxide, vanadium oxide, cerium oxide, antimony oxide, and indium-doped tin oxide. Among them, silica, alumina, titanium oxide, zinc oxide, and tin oxide are preferable, and silica is more preferable since colorless transparency, scratch resistance, cost, etc. are excellent.

With regard to these particles, one type may be used on its own or two or more types may be used in combination.

As described above, silica is more preferable as (a2); the silica may contain a component other than silica as long as the particles contain silica as a main component. Examples of the component other than silica include inorganic oxides such as an alkali metal oxide, an alkaline earth metal oxide, aluminum oxide, titanium oxide, iron oxide, zirconium oxide, zinc oxide, cerium oxide, boron oxide, tin oxide, and phosphorus oxide.

In terms of excellent transparency and scratch resistance the average particle size of (a2) is preferably in the range of 1 to 200 nm, more preferably 1 to 100 nm, and particularly preferably 5 to 50 nm. By setting the average particle size at 1 nm or greater, handling and mixing/dispersion become easy, and by setting it at no greater than 200 nm, there is no sedimentation when mixed and dispersed in the composition, and the transparency of the composition or a cured material thereof does not degrade.

In the present invention, the average particle size is a value based on a specific surface area measured by the BET method.

The specific surface area of (a2) is preferably a value in the range of 15 to 3000 $m^2/g$, and more preferably 30 to 3000 $m^2/g$. By setting the specific surface area of the particles at 15 $m^2/g$ or greater, there is no sedimentation when mixed and dispersed in the composition and the transparency of the composition or a cured material thereof does not degrade, and by setting the specific surface area of the particles at no greater than 3000 $m^2/g$, handling and mixing/dispersion become easy.

The shape of the particles of (a2) is not particularly limited, but it is preferably at least one shape selected from the group consisting of a spherical shape, a hollow shape, a porous shape, a rod shape, a plate shape, a fiber shape, and an amorphous shape. From the viewpoint of good dispersibility, it is more preferable to use spherical particles.

The state in which the particles as component (a2) are used is not particularly limited and, for example, they may be used in a dry state or in a state in which they are dispersed in water or an organic solvent.

In the invention of the present application, it is preferable to use a liquid in which microparticulate silica particles are dispersed using a dispersion solvent, that is, colloidal silica, particularly for the purpose of pursuing transparency.

Here, when the dispersion solvent is an organic solvent, examples include methanol, ethanol, isopropyl alcohol, ethylene glycol, butanol, propylene glycol monomethyl ether, ethylene glycol monopropyl ether, methyl ethyl ketone, methyl isobutyl ketone, toluene, xylene, and dimethyl formamide. Among them, it is preferable to use an alcohol such as methanol or isopropyl alcohol or a ketone such as methyl ethyl ketone. A mixture of these organic solvents with another organic solvent that is compatible therewith or water may also be used.

3. Reaction Product (A)

The reaction product (A) in the present invention is a product obtained by reacting the maleimide alkoxysilane (a1) and the inorganic oxide microparticles (a2) in the presence of water and an organic solvent. In the present invention, the reaction product (A) means the product itself, excluding the water and organic solvent used in the reaction.

As (a1) or (a2), a plurality of types of compounds, condensation products, and microparticles may be contained. Furthermore, the reaction product (A) thereof may comprise not only inorganic oxide microparticles having the surface modified with maleimide groups represented by Formula (2) above but also hydrolysis condensation products of the maleimide alkoxysilane (a1) not containing inorganic oxide microparticles, and they are also included in the definition of the reaction product (A).

The proportion of (a1) and (a2) charged in order to obtain the reaction product (A) is not particularly limited, but (a2) is preferably 1 to 1000 parts by weight relative to 100 parts by weight of (a1), more preferably 5 to 500 parts by weight, and yet more preferably 10 to 200 parts by weight.

By setting the number of parts of (a2) charged relative to 100 parts by weight of (a1) at 1 to 1000 parts by weight, scratch resistance can be improved.

The amount of water charged into the reaction system is, relative to 1 mole of the alkoxy group, preferably 1 to 30 moles, more preferably 1 to 15 moles, and yet more preferably 2 to 10 moles. By setting the amount of water charged at 1 to 30 moles per mole of the alkoxy group, the surface of the inorganic oxide microparticles can be modified effectively.

As an organic solvent, one that dissolves (a1) is preferable. It is also preferable to carry out dissolution by the use of a mixture of two or more types of solvents that cannot dissolve (a1) individually. Furthermore, it is also preferable for water to be miscible with the reaction system. Moreover, when (a2) is a uniform transparent colloid solution, it is preferable to select a solvent that does not cause coagulation of the inorganic oxide microparticles themselves.

Specific preferred examples of the organic solvent include propylene glycol monomethyl ether, propylene glycol monoethyl ether, ethylene glycol monomethyl ether, ethylene glycol monoethyl ether, dipropylene glycol monomethyl ether, dipropylene glycol monoethyl ether, diethylene glycol monomethyl ether, diethylene glycol monoethyl ether, diacetone alcohol, propylene glycol monoacetate, ethylene glycol monoacetate, diethylene glycol monoethyl ether acetate, and N-methylpyrrolidone.

The reaction temperature for obtaining the reaction product (A) depends on the presence or absence of a catalyst and the presence or absence of pressurization, but is preferably in the range of 0° C. to 200° C., more preferably 20° C. to 180° C., yet more preferably 40° C. to 160° C., and particularly preferably 60° C. to 140° C.

After the reaction is complete, it is preferable to remove water contained in the reaction system by distillation by heating, pressure reduction, etc. In this process, it is preferable to add an organic solvent that has a higher boiling point than that of water.

The reaction product (A) may be produced without a catalyst, but an acid catalyst or an alkali catalyst may be added.

Specific examples of the acid catalyst include acetic acid, hydrochloric acid, sulfuric acid, p-toluenesulfonic acid, and methanesulfonic acid.

Specific examples of the alkali catalyst include potassium hydroxide, sodium hydroxide, and tetramethylammonium hydroxide. The reaction product (A) obtained without a catalyst is preferable since there is no problem with degradation of the physical properties of a cured material due to a catalyst.

In the reaction, for the purpose of preventing polymerization of starting materials or the maleimide group of the product, it is preferable to use a polymerization inhibitor, and an oxygen-containing gas such as air may be introduced into the reaction mixture.

Specific examples of the polymerization inhibitor include the same compounds as those cited for 1-2. above.

The reaction product (A) may contain a condensation product formed by co-condensation of a hydrolysable silane compound that is different from the maleimide alkoxysilane (a1). Furthermore, it may contain inorganic oxide microparticles that are surface-modified not only with the maleimide alkoxysilane (a1) but also with a hydrolysable silane compound that is different therefrom.

Specific examples of the hydrolysable silane compound that is different from (a1) include tetramethoxysilane, tetraethoxysilane, tetraisopropoxysilane, methyltrimethoxysilane, methyltriethoxysilane, phenyltrimethoxysilane, phenyltriethoxysilane, 3-(meth)acryloyloxypropyltrimethoxysilane, 3-(meth)acryloyloxypropyltriethoxysilane, 3-aminopropyltrimethoxysilane, 3-aminopropyltriethoxysilane, vinyltrimethoxysilane, vinyltriethoxysilane, 3-mercaptopropyltrimethoxysilane, 3-mercaptopropyltriethoxysilane, 3-chloropropyltrimethoxysilane, 3-chloropropyltriethoxysilane, 3-isocyanatopropyltrimethoxysilane, 3-isocyanatoropropyltriethoxysilane, N-(2-aminoethyl)-3-aminopropyltrimethoxysilane, N-(2-aminoethyl)-3-aminopropyltriethoxysilane, p-styryltrimethoxysilane, p-styryltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-[(3-ethyloxetan-3-yl)methoxy]propyltrimethoxysilane, 3-[(3-ethyloxetan-3-yl)methoxy]propyltriethoxysilane, 3-triethoxysilyl-N-(1,3-dimethylbutylidene)propylamine, dimethyldimethoxysilane, dimethyldiethoxysilane, 3-(meth)acryloyloxypropylmethyldimethoxysilane, 3-(meth)acryloyloxypropylmethyldiethoxysilane, 3-aminopropylmethyldimethoxysilane, 3-aminopropylmethyldiethoxysilane, N-(2-aminoethyl)-3-aminopropylmethyldimethoxysilane, N-(2-aminoethyl)-3-aminopropylmethyldiethoxysilane, trimethylmethoxysilane, trimethylethoxysilane, tetrachlorosilane, methyltrichlorosilane, dimethyldichlorosilane, trimethylchlorosilane, hexamethyldisilazane, trimethoxysilane, and triethoxysilane.

Among them, in terms of a cured material obtained having excellent weather resistance, a silane compound having no aromatic group is preferable. Furthermore, as preferred compounds an alkyltrialkoxysilane, a silane compound having a (meth)acryloyloxy group having a reactive group, a silane compound having an epoxy group, a silane compound having an oxetanyl group, etc. are preferable.

3. Curable Composition

The present invention relates to a curable composition comprising the reaction product (A).

The composition of the present invention may be used as a thermally curable composition or may be used as an active energy beam-curable composition.

Since the reaction product (A) contains a maleimide group, it exhibits excellent curability by irradiation with active energy beam without adding a photopolymerization initiator or with the addition of a small amount thereof, and the composition of the present invention may be used suitably as an active energy beam-curable composition.

The composition of the present invention may comprise various compounds according to the intended application.

Specific examples thereof include a compound, other than the reaction product (A), having a total of two or more (meth)acryloyl and/or maleimide groups in one molecule.

Examples of the above compound include a compound having two or more (meth)acryloyl groups (hereinafter, called a polyfunctional (meth)acrylate), a compound having two or more maleimide groups (hereinafter, called a polyfunctional maleimide compound), and a compound having one or more (meth)acryloyl groups and one or more maleimide groups (hereinafter, called a maleimide(meth)acrylate).

Furthermore, the total number of (meth)acryloyl and maleimide groups in the compound, other than the reaction product (A), having a total of two or more (meth)acryloyl and/or maleimide groups in one molecule is preferably 2 to 10, more preferably 3 to 10, and yet more preferably 3 to 6.

Examples of the polyfunctional (meth)acrylate include the compounds below.

Bisphenol A alkylene oxide adduct di(meth)acrylate, bisphenol F alkylene oxide adduct di(meth)acrylate, bisphenol Z alkylene oxide adduct di(meth)acrylate, bisphenol S alkylene oxide adduct di(meth)acrylate, thiobisphenol alkylene oxide adduct di(meth)acrylate, bisphenol A di(meth)acrylate, bisphenol F di(meth)acrylate, bisphenol Z di(meth)acrylate, bisphenol S di(meth)acrylate, thiobisphenol di(meth)acrylate, tricyclodecanedimethylol di(meth)acrylate, ethylene glycol di(meth)acrylate, polyethylene glycol di(meth)acrylate, propylene glycol di(meth)acrylate, polypropylene glycol di(meth)acrylate, neopentyl glycol di(meth)acrylate, 1,6-hexanediol di(meth)acrylate, 1,9-nonanediol di(meth)acrylate, glycerol di(meth)acrylate, glycerol alkylene oxide adduct di(meth)acrylate, dimer acid diol di(meth)acrylate, cyclohexanedimethylol di(meth)acrylate, trimethylolpropane tri(meth)acrylate, trimethylolpropane alkylene oxide adduct tri(meth)acrylate, pentaerythritol tri- and tetra-acrylate, pentaerythritol alkylene oxide adduct tri- and tetra-acrylate, isocyanuric acid alkylene oxide adduct triacrylate, ε-caprolactone-modified tris((meth)acryloxyethyl)isocyanurate, ditrimethylolpropane tetra(meth)acrylate, dipentaerythritol hexa- and pentaacrylate, a polyester(meth) acrylate, an epoxy(meth)acrylate, a urethane(meth)acrylate, and a silicone resin having a (meth)acryloyl group at a terminal.

As the polyester(meth)acrylate, a dehydration/condensation product between a polyester polyol and (meth)acrylic acid can be cited. Examples of the polyester polyol include a reaction product of a low-molecular-weight polyol such as ethylene glycol, polyethylene glycol, cyclohexanedimethylol, 3-methyl-1,5-pentanediol, propylene glycol, polypropylene glycol, 1,6-hexanediol, or trimethylolpropane or a polyol such as an alkylene oxide adduct of the above and a dibasic acid such as adipic acid, succinic acid, phthalic acid, hexahydrophthalic acid, or terephthalic acid or an acid component such as an anhydride of the above.

Examples of the epoxy(meth)acrylate include the (meth) acrylic acid adduct of a bisphenol A epoxy resin, the (meth) acrylic acid adduct of a hydrogenated bisphenol A epoxy resin, the (meth)acrylic acid adduct of a phenol or cresol novolac type epoxy resin, the (meth)acrylic acid adduct of a biphenyl type epoxy resin, the (meth)acrylic acid adduct of a polyether diglycidyl ether such as polytetramethylene glycol, the (meth)acrylic acid adduct of polybutadiene diglycidyl ether, the (meth)acrylic acid adduct of a polybutadiene internal epoxidation product, the (meth)acrylic acid adduct of an epoxy group-containing silicone resin, the (meth)acrylic acid adduct of limonene dioxide, and the (meth)acrylic acid adduct of 3,4-epoxycyclohexylmethyl-3,4-epoxycyclohexanecarboxylate.

Examples of the urethane(meth)acrylate include a compound formed by an addition reaction between an organic polyisocyanate and a hydroxy group-containing (meth)acrylate and a compound formed by an addition reaction between an organic polyisocyanate, a polyol, and a hydroxy group-containing (meth)acrylate.

Here, as the polyol there can be cited a low-molecular-weight polyol, a polyether polyol, a polyester polyol, and a polycarbonate polyol.

Examples of the low-molecular-weight polyol include ethylene glycol, propylene glycol, neopentyl glycol, cyclohexanedimethylol, 3-methyl-1,5-pentanediol, and glycerol.

Examples of the polyether polyol include polypropylene glycol and polytetramethylene glycol.

Examples of the polyester polyol include a reaction product of the above low-molecular-weight polyol and/or polyether polyol and an acid component, for example, a dibasic acid such as adipic acid, succinic acid, phthalic acid, hexahydrophthalic acid, or terephthalic acid or an anhydride of the above.

Examples of the organic polyisocyanate include tolylene diisocyanate, xylylene diisocyanate, tetramethylxylylene diisocyanate, 4,4'-diphenylmethane diisocyanate, 4,4'-dicyclohexylmethane diisocyanate, hexamethylene diisocyanate, and isophorone diisocyanate.

Examples of the hydroxy group-containing (meth)acrylate include hydroxyalkyl(meth)acrylates such as 2-hydroxyethyl (meth)acrylate, 2-hydroxypropyl(meth)acrylate, and 4-hydroxybutyl(meth)acrylate and hydroxy group-containing polyfunctional (meth)acrylates such as pentaerythritol tri (meth)acrylate, the di(meth)acrylate of isocyanuric acid alkylene oxide 3 mole adduct, and dipentaerythritol penta(meth) acrylate.

Among the polyfunctional (meth)acrylates, when the composition is used for a hard coat application, a compound having three or more acryloyl groups is preferable since scratch resistance is excellent.

More preferred examples thereof include dipentaerythritol hexa- and penta-acrylate, isocyanuric acid ethylene oxide 3 mole adduct triacrylate, pentaerythritol tri- and tetra-acrylate, a urethane acrylate that is an addition reaction product of isocyanuric acid ethylene oxide 3 mole adduct diacrylate and hexamethylene diisocyanate, a urethane acrylate that is an addition reaction product of isocyanuric acid ethylene oxide 3 mole adduct diacrylate and isophorone diisocyanate, a urethane acrylate that is an addition reaction product of isocyanuric acid ethylene oxide 3 mole adduct diacrylate and tolylene diisocyanate, a urethane acrylate that is an addition reaction product of pentaerythritol triacrylate and hexamethylene diisocyanate, a urethane acrylate that is an addition reaction product of pentaerythritol triacrylate and isophorone diisocyanate, a urethane acrylate that is an addition reaction product of pentaerythritol triacrylate and tolylene diisocyanate, a urethane acrylate that is an addition reaction product of dipentaerythritol pentaacrylate and hexamethylene diisocyanate, a urethane acrylate that is an addition reaction product of dipentaerythritol pentaacrylate and isophorone diisocyanate, and a urethane acrylate that is an addition reaction product of dipentaerythritol pentaacrylate and tolylene diisocyanate.

As the polyfunctional maleimide compound, various compounds may be used as long as they are maleimide group-containing compounds that are not included in the reaction product (A). As a maleimide group in this case, the same group as the maleimide group in Formula (2) above is preferable.

Examples of the polyfunctional maleimide compound include a urethane compound formed by adding N-(2-hydroxyethyl)citraconimide to hexamethylene diisocyanate, a urethane compound formed by adding N-(2-hydroxyethyl) citraconimide to isophorone diisocyanate, a urethane compound formed by an addition reaction of N-(2-hydroxyethyl) citraconimide, a diol such as a polyester diol, and isophorone diisocyanate, and MIA-200, manufactured by Dainippon Ink and Chemicals, Incorporated, which is a compound having two maleimide groups.

Specific examples of the maleimide(meth)acrylate include N-(2-(meth)acryloxyethyl)tetrahydrophthalimide.

The composition of the present invention may have added thereto a compound having one unsaturated group in one molecule for the purpose of decreasing the viscosity when no solvent is used, for the purpose of enhancing adhesion to an adherend, etc.

As the unsaturated group, a (meth)acryloyl group, a maleimide group, an amide group, and a vinyl group are preferable.

Specific examples thereof include (meth)acrylic acid, Michael addition type dimer of acrylic acid, ω-carboxypolycaprolactone mono(meth)acrylate, monohydroxyethyl (meth)acrylate phthalate, methyl(meth)acrylate, ethyl(meth) acrylate, butyl(meth)acrylate, 2-ethylhexyl(meth)acrylate, benzyl(meth)acrylate, phenyl(meth)acrylate, phenol alkylene oxide adduct (meth)acrylate, alkylphenol alkylene oxide adduct (meth)acrylate, cyclohexyl(meth)acrylate, tert-butylcyclohexyl(meth)acrylate, 2-hydroxyethyl(meth)acrylate, 2-hydroxypropyl(meth)acrylate, 4-hydroxybutyl acrylate, paracumylphenol alkylene oxide adduct (meth)acrylate, orthophenylphenol(meth)acrylate, orthophenylphenol alkylene oxide adduct (meth)acrylate, tetrahydrofurfuryl(meth) acrylate, isobornyl(meth)acrylate, tricyclodecanemethylol (meth)acrylate, 2-hydroxy-3-phenoxypropyl(meth)acrylate, N-(2-(meth)acryloxyethyl)hexahydrophthalimide, N-(2-hydroxyethyl)citraconimide, N,N-dimethylacrylamide, acryloylmorpholine, N-vinylpyrrolidone, and N-vinylcaprolactam.

The composition of the present invention preferably comprises an organic solvent (hereinafter, also simply called a solvent) when coating is carried out as a thin film, as in the case of a hard coat.

The type of solvent is not particularly limited, but is preferably selected from a solvent that dissolves the reaction product (A) and other components.

Examples of the solvent include alcohols such as ethanol and isopropanol; alkylene glycol monoethers such as ethylene glycol monomethyl ether and propylene glycol monomethyl ether; acetone alcohols such as diacetone alcohol; aromatic compounds such as toluene and xylene; esters such as propylene glycol monomethyl ether acetate, ethyl acetate, and butyl acetate; ketones such as acetone, methyl ethyl ketone, and methyl isobutyl ketone; ethers such as dibutyl ether; and N-methylpyrrolidone.

With regard to the solvent, it is preferable to employ a method in which the solvent when producing the reaction product (A) is used as the solvent for the composition as it is since there is the advantage that the production cost can be reduced.

However, where a solvent is not essential and hard coat performance is not required for the composition of the present invention, the composition can be a non-solvent system using a low-viscosity monomer for dilution.

The composition of the present invention may comprise an organic polymer for the purpose of reducing the curing shrinkage by means of an inexpensive component, etc. Examples of suitable polymers include a (meth)acrylic polymer, and examples of suitable constituent monomers include methyl(meth)acrylate, cyclohexyl(meth)acrylate, and N-(2-(meth)acryloxyethyl)tetrahydrophthalimide.

The composition of the present invention may comprise a radical polymerization inhibitor or an antioxidant for the purpose of enhancing storage stability or thermal stability.

Specific examples of the radical polymerization inhibitor include the compounds shown above for the production of the reaction product (A).

Specific examples of the antioxidant include hindered phenol-based antioxidants such as 2,6-di-tert-butyl-4-methylphenol and pentaerythritol tetrakis(3-(3,5-di-tert-butyl-4-hydroxyphenyl)propionate). Furthermore, a phosphorus-based secondary antioxidant or a sulfur-based secondary antioxidant such as 4,6-bis(octylthiomethyl)-O-cresol may be added.

The composition of the present invention may comprise a leveling agent for the purpose of enhancing leveling performance when coating. As a leveling agent, various substances such as a silicone-based polymer and a fluorine atom-containing polymer may be used.

The composition of the present invention may comprise a UV absorber or a light stabilizer for the purpose of enhancing UV resistance and weather resistance. Specific examples of suitable UV absorbers include hydroxyphenyltriazine-based UV absorbers such as 2-[4-[(2-hydroxy-3-dodecyloxypropyl)oxy]-2-hydroxyphenyl]-4,6-bis(2,4-dimethylphenyl)-1,3,5-triazine, benzotriazole-based UV absorbers such as 2-(2H-benzotriazol-2-yl)-4,6-bis(1-methyl-1-phenylethyl)phenol, and UV-absorbing inorganic microparticles such as titanium oxide microparticles and zinc oxide microparticles. Specific examples of suitable light stabilizers include hindered amine-based light stabilizers such as bis(1,2,2,6,6-pentamethyl-4-piperidinyl)sebacate.

The composition of the present invention may comprise, in addition to a radically polymerizable compound, a cationically curable monomer or oligomer for an epoxy resin, an oxetane resin, etc. In this case, it is preferable to add a substance that generates an acid by means of light or heat or a thermo-latent curing catalyst.

Other than the above, the composition of the present invention may comprise as necessary various fillers such as silica and alumina, metal microparticles, a pigment, etc.

The 'microparticles' referred to in the present invention are preferably particles having an average particle size of 1 to 200 nm.

When the composition of the present invention is thermally cured, it is preferable to add a thermal radical polymerization initiator such as an organic peroxide or an azo-based compound.

4. Active Energy Beam-Curable Composition

As described above, the composition of the present invention may preferably be used as an active energy beam-curable composition.

In this case, for the purpose of enhancing cure rate, adhesion to a substrate, etc., a photosensitizer or a photopolymerization initiator may be added.

Examples of suitable photosensitizers include thioxanthone-based compounds such as diethylthioxanthone and diisopropylthioxanthone, acetophenone, and benzophenone.

When the composition of the present invention is used as an active energy beam-curable composition, as described above, it is possible to carry out curing without adding a photopolymerization initiator but it is also possible to add a photopolymerization initiator for the purpose of enhancing cure rate, etc.

Specific examples of the photopolymerization initiator include acetophenone-based compounds such as 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 2-methyl-1-[4-(methylthio)phenyl]-2-morpholinopropan-1-one, 2-benzyl-2-dimethylamino-1-(4-morpholinophenyl)butan-1-one, diethoxyacetophenone, oligo{2-hydroxy-2-methyl-1-[4-(1-methylvinyl)phenyl]propanone}, and 2-hydroxy-1-{4-[4-(2-hydroxy-2-methylpropionyl)benzyl]phenyl}-2-methylpropan-1-one; benzophenone-based compounds such as benzophenone, 4-phenylbenzophenone, 2,4,6-trimethylbenzophenone, and 4-benzoyl-4'-methyldiphenylsulfide; α-ketoester-based compounds such as methylbenzoyl formate, the 2-(2-oxo-2-phenylacetoxyethoxy)ethyl ester of oxyphenylacetic acid, and the 2-(2-hydroxyethoxy)ethyl ester of oxyphenylacetic acid; phosphine oxide-based compounds such as 2,4,6-trimethylbenzoyldiphenylphosphine oxide, bis(2,4,6-trimethylbenzoyl)phenylphosphine oxide, and bis(2,6-dimethoxybenzoyl)-2,4,4-trimethylpentylphosphine oxide; benzoin-based compounds such as benzoin, benzoin methyl ether, benzoin ethyl ether, benzoin isopropyl ether, and benzoin isobutyl ether; titanocene-based compounds; acetophenone/benzophenone hybrid-based photoinitiators such as 1-[4-(4-benzoylphenylsulfanyl)phenyl]-2-methyl-2-(4-methylphenylsulfinyl)propan-1-one; oxime ester-based photopolymerization initiators such as 2-(O-benzoyloxime)-1-[4-(phenylthio)]-1,2-octanedione; and camphorquinone.

Specific examples of the active energy beam include an electron beam, UV, and visible light, and UV is particularly preferable.

As a UV irradiator, a high pressure mercury lamp, a metal halide lamp, a UV electrodeless lamp, an LED, etc. can be cited.

The irradiation energy should be set as appropriate according to the type of active energy beam and mixture composition, but as one example when a high pressure mercury lamp is used, irradiation energy in the UV-A region is preferably 100 to 5,000 mJ/cm$^2$, and more preferably 500 to 3,000 mJ/cm$^2$.

5. Application

The composition of the present invention can be used in various applications. Examples thereof include coating agents and adhesives.

As an active energy beam-curable composition, in addition to the applications above, it may be used as a cladding material of an optical waveguide, an insulation-coating material for electric wiring, or a photoresist.

As a substrate that can be employed, various materials may be used, and examples thereof include a polymer such as a plastic, glass, metal, ceramic, a metal oxide-vapor deposited film, silicon, and wood.

The composition of the present invention may be used preferably as a coating agent, and may be used suitably for a hard coat of a polymer material, a paint for woodworking, etc.

Specific examples of the polymer include a polyester such as polyethylene terephthalate or polyethylene naphthalate, polycarbonate, polyethylene, polypropylene, a cycloolefin polymer, an acrylic resin, a methacrylic resin, a methyl methacrylate-styrene copolymer resin (MS resin), polystyrene, polyvinyl chloride, polyvinyl alcohol, triacetylcellulose, polyether sulfone, polyimide, polyimide, a urea/melamine resin, an epoxy resin, polyurethane, polylactic acid, and a liquid crystal polymer. When the polymer is poorly adhesive, it is preferable to carry out an adhesion promotion treatment such as a corona treatment in order to enhance adhesion.

When the composition of the present invention is used in a hard coat, a metal alkoxide such as tetraethoxysilane or tetraisopropoxytitanium may be added. Here, in order to carry out a hydrolysis reaction effectively, a photo-acid generator or a photo-base generator may be added.

The most preferred application form of the composition of the present invention is a composition for an active energy beam-curable hard coat. In this case, a composition containing a solvent is preferable in terms of cured coating scratch resistance and coating properties. Specific examples of the solvent are as described in the section relating to the curable composition. The proportion of the solvent in the composition is preferably 10 to 90 wt %.

As a process for producing a hard coat, it may accord with a standard process, and examples include a process in which a substrate is coated with the composition, thermally dried, and then irradiated with active energy beam so as to cure it.

The coating conditions and thermal drying conditions in this case may accord with a standard method. Irradiation with active energy beam may be carried out in accordance with the above-mentioned preferred conditions.

The composition for an active energy beam-curable hard coat may be used suitably for a hard coat of an optical sheet used in a liquid crystal display, a projection television, etc. or for a hard coat of a plastic product related to vision such as a spectacle lens, goggles, or a motorcycle helmet visor. Furthermore, it may also be used suitably as a hard coat for a housing of portable products such as mobile phone, consumer electric products, etc.

It may be used for substrates other than plastics in various applications such as, for example, a hard coat for wooden products such as floor materials or furniture or a paint for vehicles such as automobiles, bicycles, or trains.

When the composition of the present invention is used as a coating agent, the present invention also relates to an article obtained by forming a cured film of the composition of the present invention on the surface of a substrate.

Specific examples and preferred examples of the substrate in this case are the same as those described above.

As a method for forming a cured film, it may accord with a standard method, and examples include a method in which a substrate is coated with the composition and then heated in the case of a thermally curable composition or irradiated with active energy beam in the case of an active energy beam-curable composition.

In this case, the method for coating of the composition, heating conditions, active energy beam irradiation conditions, etc. may accord with a standard method.

In accordance with the present invention, there can be provided a curable composition that has excellent smoothness when a plastic substrate is coated therewith and dried, causes hardly any warp after curing or swarf when cutting, and has excellent scratch resistance, transparency, adhesion, and UV resistance.

EXAMPLES

The present invention is explained more specifically below by reference to Examples and Comparative Examples. The present invention should not be construed as being limited by these Examples.

Furthermore, 'parts' below means parts by weight and means wt %.

Synthetic Example 1

Production of Maleimide Alkoxysilane (a1)

A 1 L separable flask equipped with a stirrer was charged with 266.4 g of toluene, 89.6 g (0.80 mol) of citraconic anhydride, and 0.19 g of hydroquinone monomethyl ether (hereinafter, also called MQ), and 176.8 g (0.80 mol) of 3-aminopropyltriethoxysilane was added dropwise at room temperature while stirring. After the dropwise addition was completed, the temperature was raised until ethanol was distilled, and a reaction was subsequently carried out while maintaining the reaction solution at 100° C. to 105° C. for 4 hours. After the reaction was completed, low boiling point components such as toluene and ethanol were removed by distillation under reduced pressure while heating the flask in an oil bath at 80° C., thus synthesizing maleimide alkoxysilane (a1).

It was confirmed by a $^1$H-NMR spectrum that the structure of (a1) thus obtained was a compound in which in Formula (1) and Formula (2) above R$^1$ was a methyl group, R$^2$ was a hydrogen atom, R was a trimethylene group, R$^3$ was an ethyl group, a=0, and z was 1. Furthermore, it was confirmed by gel permeation chromatography (hereinafter, also called GPC) (solvent: tetrahydrofuran) that it was a mixture of a component that was made to have a high molecular weight by condensation and a low-molecular-weight component for which the degree of condensation was low or that was not condensed.

Example 1

Synthesis of Reaction Product (A)

First, the maleimide alkoxysilane (a1) obtained in Synthetic Example 1 was dissolved in propylene glycol monomethyl ether (hereinafter, also called PGM) at a concentration of 50%, and a trace amount of white residue was filtered off, thus giving a pale yellow transparent solution.

A 300 mL separable flask equipped with a stirrer and a condenser was charged with 50 g of this solution, 0.01 g of MQ, and 7.2 g of water, stirring and dissolution were carried out at room temperature, and 33 g of colloidal silica {Colloidal Silica IPA-ST, Nissan Chemical Industries Ltd., average particle size: 10 to 15 nm (a value measured by the BET method), solids content 30%, containing 70% of isopropyl alcohol} was then added. This reaction mixture was reacted at 80° C. for 4 hours, and isopropyl alcohol, water, etc. were removed by distillation until the nonvolatile content became about 50%. Subsequently, the operation of adding 50 g of PGM and removing by distillation with the remaining water in the reaction system so as to make the nonvolatile content about 50% was repeated three times, water in the reaction system was thereby removed by distillation, and the reaction product (A) of the present invention was synthesized.

The nonvolatile content of the solution after the reaction was 59%. It was confirmed from a $^1$H-NMR spectrum that a decomposition reaction such as maleimide ring hydrolysis did not occur. It was confirmed by GPC that peaks at a number-average molecular weight on a polystyrene basis of 332 and 594, which were present for (a1), had disappeared.

Among the solutions obtained here after completion of the reaction, components excluding solvent are defined hereinafter as the reaction product (A) and expressed as CCS-1.

For analysis, the reaction product (A) was poured into 80 times by weight of acetonitrile so as to make silica coagulate and precipitate, centrifuging, decantation, washing with acetonitrile, and centrifuging were carried out, and the precipitate was dried at 80° C. for 30 minutes. From the result of measuring an infrared absorption spectrum of this precipitate, peaks due to a maleimide group were clearly observed together with peaks due to silica, and it was confirmed that colloidal silica was surface-modified with maleimide groups. From the result of estimating the organic content of the silica component from the decrease in weight in going from room temperature to 1000° C. in a thermogravimetric analysis, the organic content was 11%.

Example 2 to Example 4 and Comparative Example 1 to Comparative Example 3

<Production of Active Energy Beam-Curable Composition>

The components shown in Table 1 were stirred and dissolved by a standard method, thus producing an active energy beam-curable composition. The units for the numbers in Table 1 are parts by weight.

TABLE 1

|  | Ex. 2 | Ex. 3 | Ex. 4 | Comp. Ex. 1 | Comp. Ex. 2 | Comp. Ex. 3 |
|---|---|---|---|---|---|---|
| CCS-1 | 100 | 50 | 50 |  |  |  |
| M-402 |  | 50 | 50 | 100 | 75 | 50 |
| Colloidal silica |  |  |  |  | 25 | 50 |
| DETX | 2 | 2 | 2 | 2 | 2 | 2 |
| PGM | 150 | 150 | 150 | 150 | 92 | 33 |
| IPA |  |  |  |  | 58 | 117 |

The abbreviations in Table 1 have the following meanings.
CCS-1: reaction product (A) obtained in Example 1, excluding PGM, which is a solvent.
M-402: polyfunctional acrylate containing dipentaerythritol penta-and hexa-acrylates as main components, Aronix M-402, Toagosei Co., Ltd.
Colloidal silica: silica component contained in Organosilica Sol IPA-ST (isopropyl alcohol 70%), Nissan Chemical Industries Ltd.
DETX: 2,4-diethylthioxanthone, Kayacure DETX-S, Nippon Kayaku Co., Ltd.
PGM: propylene glycol monomethyl ether.
IPA: isopropyl alcohol.

In Table 1, the number of parts of CCS-1 denotes the number of parts by weight of the reaction product (A) in Example 1, that is, the number of parts excluding PGM, which is a solvent, but in the actual mixing the PGM solution was used as it was. The number of parts of PGM in Table 1 denotes the total value including the PGM carried together with CCS-1.

<Method for Hard Coat Treatment>

As substrates, a cycloolefin polymer, manufactured by Nippon Zeon Corporation (ZEONOR-1420, thickness 0.20 mm), corona-treated (hereinafter, abbreviated to C-Zeo), and a polycarbonate plate obtained from Engineering Test Service [starting material lupilon sheet NF-2000, Mitsubishi Engineering-Plastics Corporation, thickness 1.0 mm, hereinafter abbreviated to PC] were used. With regard to the dimensions of the substrates, C-Zeo was A4 size, and PC was 10 cm×10 cm.

These substrates were coated with the compositions shown in Table 1 using a bar coater at a dry coat thickness of 7 μm, dried using a hot air dryer at 100° C. for 5 minutes, and then immediately irradiated with UV, thus giving a hard coat cured film.

Irradiation with UV was carried out using an electrodeless lamp (H bulb) manufactured by Fusion UV Systems Japan KK, the lamp height was the focusing distance (10 cm) of a focusing mirror, the conveyor speed was 10 m/min, and irradiation was carried out by 6 passes. Irradiation energy per pass, in the UV-A region of a UV POWER PUCK manufactured by EIT, was 500 mJ/cm$^2$ (total 3000 mJ/cm$^2$).

The cured films thus obtained (hereinafter, called test samples) were subjected to evaluation by the methods shown below. The text within the parentheses for a test sample refers to the substrate.

<Evaluation Methods>

(Odor After Curing)

The odor of a test sample (C-Zeo) immediately after UV irradiation was checked; it was evaluated as Good when there was no odor from the test sample (C-Zeo), Fair when slight odor was sensed, and Poor when there was an odor.

(Smoothness)

In the test samples (C-Zeo, PC), it was evaluated as Good when the cured coating was visually smooth, Fair when there was slight coating unevenness, and Poor when there was coating retraction.

(Visual Transparency)

In the test samples (C-Zeo, PC), it was evaluated as Good when there was no visible cloudiness at all, Fair when there was slight cloudiness, and Poor when there was clearly cloudiness.

(Warp)

A 10 cm×10 cm size test sample (C-Zeo) was cut out and allowed to stand under an environment at 23° C. 50% R.H. for 1 week. This was placed on a smooth glass plate with the hard coat face upward, the heights of four corners that were floating up were measured, and the average value (mm) was calculated. When warp occurred on the opposite side, the heights were measured in the same manner with the hard coat face downward, and the average value is given with a minus symbol in the table.

(Swarf)

The degree of powder (swarf) generated when the test sample (C-Zeo) was cut using a cutter was visually determined and evaluated as follows.

Good: there was no swarf at all
Fair: some swarf occurred
Poor: much swarf occurred (Scratch Resistance)

The hard coat face of a test sample (C-Zeo, PC) was made to do 50 back-and-forth traverses on a 2 cm×2 cm piece of #0000 steel wool with a load of 1 kg, and the condition of scratching was judged visually and evaluated as follows.
Excellent: there were no scratches at all
Good: there were a few scratches
Fair: there were many scratches but the haze was less than 5%
Poor: whitened and the haze was 5% or greater C-Zeo that had not been subjected to a hard coat treatment was whitened and the haze was 25%.

(Adhesion)

In accordance with JIS K5400, the hard coat face of the test sample (C-Zeo, PC) was cut into 100 squares with 11 vertical and horizontal lines having a gap of 1 mm using a cutter, Sellotape (registered trademark) manufactured by Nichiban Co., Ltd. was adhered with pressure and peeled off, and the % area of film remaining was evaluated as follows.
Good: percentage film remaining 100%
Fair: percentage film remaining 85 to 99%
Poor: percentage film remaining 5 to 84%
Very Poor: percentage film remaining 0 to 4%

(UV Resistance)

A test sample (PC) was irradiated with UV using a 80 W/cm high-pressure mercury lamp (equipped with a parallel beam mirror, lamp height 30 cm) manufactured by Eye Graphics Co., Ltd. continuously for 5 minutes, then cooled to room temperature for a moment, and irradiated again continuously for 5 minutes.

The irradiation intensity this time was, as values measured by a UV POWER PUCK manufactured by EIT, 146 mW/cm² for UV-A, 91 mW/cm² for UV-B, 18 mW/cm² for UV-C, and 55 mW/cm² for UV-V (integrated light intensity for UV-A 87,600 mJ/cm²).

After this irradiation with UV, the state of the cured film was examined visually and evaluated as follows.
Good: there were no cracks at all in the coated film
Fair: there were some cracks in the coated film
Poor: there were many cracks in the coated film <Evaluation Results>

The evaluation results are shown in Table 2. Table 2 suggests the following.

The composition of Example 2 had good scratch resistance, did not cause any warp or swarf, and exhibited good transparency, adhesion to the substrate, and UV resistance.

The compositions of Example 3 and Example 4 caused a little swarf when cutting the films, but the scratch resistance was very good, there was no warp, and transparency, adhesion to the substrate, and UV resistance were good. The composition of Example 3, which comprised neither photoinitiator nor sensitizer, was one in which no odor was sensed after curing.

On the other hand, with the composition of Comparative Example 1, the occurrence of warp and swarf was marked, and UV resistance was insufficient. Furthermore, the compositions of Comparative Example 2 and Comparative Example 3 suppressed warp compared with Comparative Example 1, but a large amount of swarf was produced, and the UV resistance was not sufficient either.

TABLE 2

|  | Substrate | Ex. 2 | Ex. 3 | Ex. 4 | Comp. Ex. 1 | Comp. Ex. 2 | Comp. Ex. 3 |
| --- | --- | --- | --- | --- | --- | --- | --- |
| Odor after curing | C-Zeo | Fair | Good | Fair | Fair | Fair | Fair |
| Smoothness | C-Zeo | Good | Good | Good | Fair | Good | Good |
|  | PC | Good | Good | Good | Fair | Good | Good |
| Visual transparency | C-Zeo | Good | Good | Good | Good | Good | Good |
|  | PC | Good | Good | Good | Good | Good | Good |
| Warp (mm) | C-Zeo | 0 | 0 | 0 | 7 | 2 | −4 |
| Swarf | C-Zeo | Good | Fair | Fair | Poor | Poor | Poor |
| Scratch resistance | C-Zeo | Good | Excellent | Excellent | Excellent | Excellent | Excellent |
|  | PC | Good | Excellent | Excellent | Excellent | Excellent | Excellent |
| Adhesion | C-Zeo | Good | Good | Good | Good | Good | Good |
|  | PC | Good | Good | Good | Good | Good | Good |
| UV resistance | PC | Good | Good | Good | Poor | Poor | Poor |

INDUSTRIAL APPLICABILITY

The curable composition of the present invention can be used suitably as an active energy beam-curable composition and can be used particularly suitably as an active energy beam-curable composition for a hard coat.

The invention claimed is:

1. An actinic radiation-curable composition comprising:
a reaction product (A) obtained by reacting an alkoxysilane compound (a1) represented by Formula (1) below and inorganic oxide microparticles (a2) in the presence of water and an organic solvent, and
a compound, other than the reaction product (A), having a total of 2 to 10 (meth)acryloyl and/or maleimide groups in one molecule, $$(P\text{—}SiO_{3/2})_{1-a}(P\text{—}Si(R^0)O_{2/2})_a(O_{1/2}R^3)_z \quad (1)$$

wherein, in Formula (1), P denotes a group represented by Formula (2) below, $R^3$ denotes a hydrogen atom or a monovalent organic group, $R^0$ denotes a monovalent organic group, a is 0 or a positive number and satisfies $0 \leq a < 1$, z is a positive number and satisfies $0.1 \leq z \leq 2$, P, $R^0$, and $R^3$ may each comprise two or more different types of groups in one molecule, and $R^0$ and $R^3$ may each be identical groups or different groups in one molecule, (2)

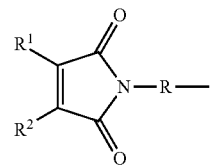

wherein, in Formula (2), $R^1$ and $R^2$ independently denote a hydrogen atom, a halogen atom, an alkyl group, an alkenyl group, or an aryl group, or $R^1$ and $R^2$ denote hydrocarbon groups together forming one 5-membered ring or 6-membered ring, and R denotes a divalent organic group.

2. The actinic radiation-curable composition according to claim 1, wherein in Formula (2) above R is a divalent saturated hydrocarbon group.

3. The actinic radiation-curable composition according to claim 1, wherein in Formula (2) above one of $R^1$ and $R^2$ is a hydrogen atom and the other is an alkyl group.

4. The actinic radiation-curable composition according to claim 1, wherein the compound of Formula (1) above is a compound represented by Formula (3) below,

wherein, in Formula (3), P' denotes a group represented by Formula (4) below, $R^{3'}$ denotes a monovalent organic group having 1 to 8 carbons or a hydrogen atom, and z denotes a positive number for which $0.1 \leq z \leq 2$,

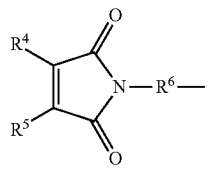

wherein, in Formula (4), with regard to $R^4$ and $R^5$, one is a hydrogen atom and the other is an alkyl group having 1 to 6 carbons, both are alkyl groups having 1 to 6 carbons, or they denote saturated hydrocarbon groups together forming one 6-membered ring, and $R^6$ denotes a divalent saturated hydrocarbon group having 2 to 6 carbons.

5. The actinic radiation-curable composition according to claim 1, wherein the inorganic oxide microparticles (a2) are colloidal silica having an average particle size of 1 to 200 nm.

6. The actinic radiation-curable composition according to claim 1, wherein the actinic radiation-curable composition is for a hard coat.

7. An article obtained by forming a cured film of the composition according to claim 1 on the surface of a substrate.

8. The actinic radiation-curable composition according to claim 1, wherein in Formula (2) above both $R^1$ and $R^2$ are hydrogen atoms, one is a hydrogen atom and the other is an alkyl group, both are alkyl groups, or both are saturated hydrocarbon groups together forming one 5-membered ring or 6-membered ring.

* * * * *